March 31, 1964  W. F. TRAUGOTT ETAL  3,127,192

BALL JOINT ADJUSTER

Filed Feb. 19, 1962

INVENTORS
WILFRED F. TRAUGOTT
WILLIAM A. SCHEUBLEIN, JR.
BY
*Gravely, Lieder & Woodruff*

ATTORNEYS

United States Patent Office 3,127,192
Patented Mar. 31, 1964

3,127,192
BALL JOINT ADJUSTER
Wilfred F. Traugott, West Point, Va., and William A. Scheublein, Jr., St. Louis, Mo., assignors to Moog Industries, Inc., St. Louis, Mo., a corporation of Missouri
Filed Feb. 19, 1962, Ser. No. 174,170
3 Claims. (Cl. 280—96.1)

This invention relates to ball joint adjusters and an important object thereof is to provide a simple and easily manipulated adjuster for reducing the amount of end play or looseness in ball joints.

A problem with ball joint devices for vehicle wheel suspensions is that as wear occurs the end play or axial looseness of the stud head in the housing or socket increases and noise results. While a loose ball joint may be structurally sound and quite capable of withstanding the stresses in use, nevertheless the noise present makes the vehicle owner think that something is dangerous and ready to break. This is highly objectionable and could become serious if the end play were permitted to continue as there is sufficient stress if uncorrected to cause trouble.

It is, therefore, another object of this invention to provide a ball joint adjuster which will reduce the dangerous stress conditions in service.

It is also an object of this invention to provide an adjuster which is capable of being installed and adjusted within the limited space encountered in a large number of vehicles.

These and other objects and advantages will be disclosed and described in connection with certain presently preferred embodiments of the invention. Generally the adjuster may comprise thrust means acting in the direction of the end play and means to cause the thrust means to act together with means to retain the adjuster in its adjusted condition. A better understanding of the invention will be had by reference to the accompanying drawings, wherein.

Figure 1:
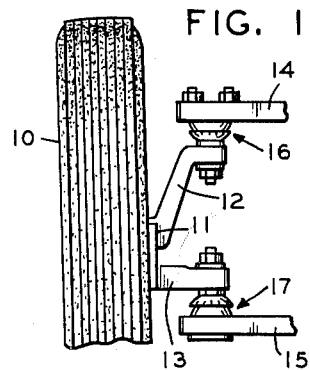
FIG. 1 is an elevational view of a ball joint and a ball joint adjuster mounted in a wheel suspension system.

In FIG. 1 a representative vehicle wheel mounting system is seen to include the steerable wheel 10 mounted on a spindle 11 having an upper bracket arm 12 and a lower bracket arm 13. The vehicle frame (not shown) mounts the respective upper and lower control arms 14 and 15. A ball joint device 16 connects the control arm 14 and the bracket arm 12, and another ball joint 17 interconnects control arm 15 with the bracket arm 13. The ball joints 16 and 17 permit angular and pivoting movement of the wheel 10 relative to the control arms 14 and 15 in the usual manner.

Figure 2:
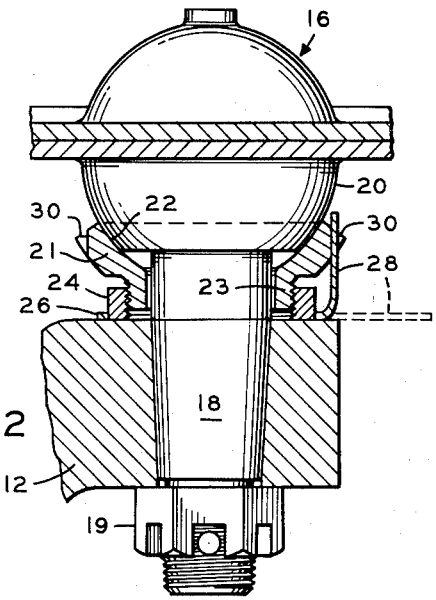
FIG. 2 is a greatly enlarged sectional view of the ball joint adjuster in association with a ball joint assembly.
Figure 3:
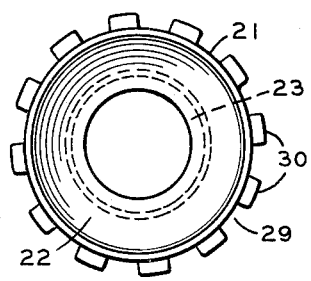
FIG. 3 is a plan view of the thrust member of the adjuster shown in FIG. 2.
Figure 4:
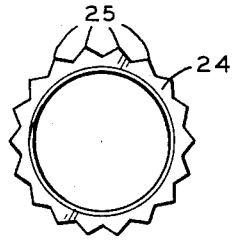
FIG. 4 is a plan view of the elevating nut in the adjuster shown in FIG. 2.

In FIG. 2 there is shown an enlarged view of the ball joint 16 having its stud shank 18 secured in the bracket arm 12 by a nut 19. The shank 18 has a tapered portion which is located in the eye of the arm 12 and a further portion which extends above the arm 12 and enters the housing 20 of the ball joint 16. The housing is spaced a short distance from the arm 12 in order to allow for angular motion and in the usual mounting this space is quite restricted and not easily reached. Since many ball joints do not have any means whereby wear may be compensated it becomes difficult to provide wear adjustment means while not interfering with the pivoting and angular motions which are important to the proper function of the ball joint.

One embodiment of the ball joint adjuster is shown in FIGS. 2 to 5, inclusive. Such an embodiment includes a cup-shaped thrust member 21 having a semi-spherical seat surface 22 which engages the similarly shaped outer surface of the adjacent ball joint housing 20 to permit angular or swivelling motion of the housing in the seat surface 22. The thrust member has an extension 23 forming a bore to receive the shank 18 of the usual ball joint stud. The exterior of the extension is suitably threaded to cooperate with an elevating nut member 24 (FIG. 4) whose exterior surface is formed with serrations 25 about its circumference. The members 21 and 24 are threadedly assembled about the shank 18 with the nut 24 bearing on the adjacent arm 12 about the eye for the shank and the thrust member 21 seating on the ball joint housing 20. It may be seen in FIG. 2 that as the nut 24 is rotated to elevate the thrust member 21 is will bear down on arm 12 and effect an axial thrust reaction which lifts or elevates the housing 20. This thrust reaction adjusts out end play with the ball joint but does not restrict relative movement of the arm 12.

The members 21 and 24 are adjusted and locked by the locking member 26 which has its inner surface formed with serrations 27 matching those on the nut 24. Locking member 26 has a handle 28 which is used as a wrench to rotate the member 26 and turn the elevating nut 24 to the extent desired. After adjustment, the handle 28 may be bent upwardly so that its end portion engages in any one of a plurality of notches 29 formed on the lip of the thrust member 21 by the spaced projections 30. Subsequent adjustments may be made by removing the handle 28 from a notch 29 and readjusting the elevating nut 24. Should the initial or subsequent adjustments end up with the handle 28 misaligned with a notch, it is a simple operation to lift the locking member 26 above the nut 24 and turn it to another position where the handle 28 will align with a notch 29.

Since the locking member 26 is movable axially of the nut 24, as above indicated, it must be retained from working itself above the nut otherwise the nut may vibrate to spoil the adjustment. The handle 28 in its bent position (full line in FIG. 2) is made sufficiently long to strike the ball joint housing 20 before the member 26 can rise above the nut 24.

Figure 6:
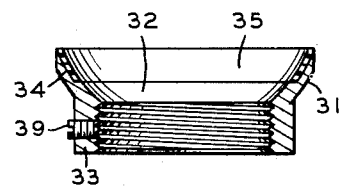
FIG. 6 is a sectional elevational view of a modified thrust member useful in the present adjuster invention.
Figure 5:
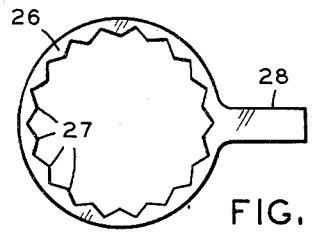
FIG. 5 is a plan view of the locking member of the adjuster shown in FIG. 2.
Figure 7:
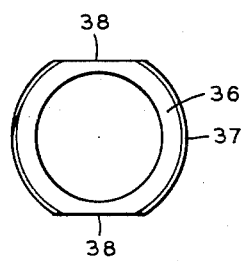
FIG. 7 is a plan view of a modified elevating nut to be applied with the thrust member of FIG. 6.

A modified embodiment of this invention is shown in FIGS. 6 and 7. Here the thrust member 31 has the cup-shaped semi-spherical surface 32 to engage the ball joint housing 20, and an extension 33 with internal threads. The lip portion of the member 31 is recessed at 34 to receive a seal ring 35 which may be formed of nylon or other suitable material. Such seal ring may also be incorporated in the thrust member 21. The modified member 31 cooperates with an elevating nut member 36 having external threads 37 about the periphery for engagement in the threaded extension 33. The nut has opposed flats 38 to be used when effecting adjustment of the thrust member 31 upwardly against the ball joint housing 20. A set screw 39 carried by the member 31 serves to lock the parts in adjusted setting.

Figure 8:
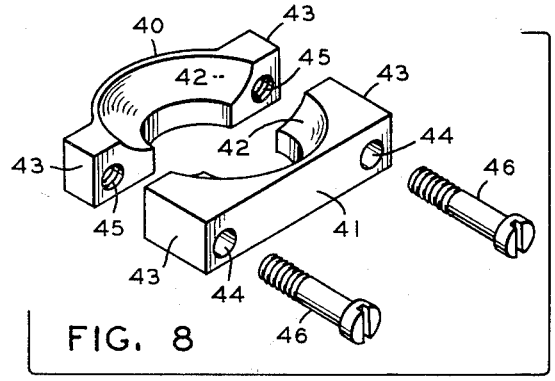
FIG. 8 is a modified form of ball joint adjuster.

A further modification of the present ball joint adjuster invention is seen in FIG. 8. In this embodiment, the thrust member is formed in two parts 40 and 41, such parts being semi-circular. Each part 40 and 41 has a thrust surface 42 and a pair of oppositely extending ears 43. The ears 43 on the part 41 are provided with smooth bore apertures 44 while the cooperating ears 43 on part 40 have threaded apertures 45. Threaded screws 46 are received in the smooth apertures 44 and thread into the apertures 45 such that the parts 40 and 41 may be drawn together and in so doing exert an axial lift on the ball joint housing 20. The spacing of the ears 43 in this form of the adjuster is sufficient to allow the desired elevating reaction on the ball joint housing 20 while the parts 40 and 41 slide on the surface of the bracket arm 12 about the stud receiving eye therein. It will be appreciated that this embodiment may be installed without having to disconnect the stud shank 18 from arm 12 as the split or two part form thereof will allow its placement in operative position before inserting the screws 46. Since the screws 46 are directed at right angles to the stud shank 18, a screw driver may be used without difficulty, and the members 40 and 41 may be turned to a position such that the screw heads are accessible.

Having described certain embodiments of this invention, it will be understood that various changes may be made in the construction and arrangement of the components and parts without departing from the spirit and scope of the invention as set forth in the appended claims.

What is claimed is:

1. In a vehicle wheel suspension system having a wheel supporting arm connected to a suspension control arm by a rotatable and an angularly movable ball joint assembly including a housing carried by one of the arms and having an exposed external semi-spherical surface thereon and a stud shank extending therefrom for connection with the other one of the arms, the improvement of a nonyieldable adjuster for correcting for ball joint wear, said adjuster comprising a thrust member having a cupped surface engaging the ball joint housing at said semi-spherical surface for swivelling movement thereon and a threaded portion surrounding said stud shank, a wear take-up member threadedly engaging said threaded portion of said thrust member and bearing upon the other one of the arms about the shank connection with such arm, said wear take-up member being rotatable relative to the other one of the arms and said thrust member to cause movement of said thrust member toward the ball joint housing and separation of the arms to adjust for wear, and a combined turning and locking means engaging said wear take-up member about its periphery to effect adjustments thereof for moving said thrust member, said locking means having an element extending therefrom and movable into engagement with said thrust member to prevent relative movement between said members.

2. In combination with a ball joint device having a housing and an extending relatively movable stud shank in which the housing and shank are connected between two relatively movable arm means in which the principal forces are in a direction substantially parallel to the lengthwise axis of the stud shank, the improvement of an adjuster to compensate for wear in the ball joint and reduce looseness in the direction of principal forces, said adjuster including a non-yieldable thrust transmitting member having a bearing surface engaging the ball joint housing without substantially interferring with its movement, a thrust producing member operatively engaged with said thrust transmitting member and having a thrust reaction engagement on the arm means to which the stud shank is connected, the operative engagement of said members being such that said members move relative to each other and in the axial direction of the stud shank, and locking means engaging both said members in the adjusted position thereof, said locking means including a body engaged on said thrust producing member and a projection extending from said body to be selectively a handle for operating said thrust producing member and a bendable tang to engage said thrust transmitting member.

3. In a vehicle wheel suspension system having a wheel carrying arm and a suspension arm: the improvement with a ball joint assembly having a housing fixed to one of the arms and a ball stud movably bearinged internally of said housing and having a shank extending outwardly of said housing to be connected to the other of the arms to permit relative movement between the arms, said housing having an external bearing surface adjacent said outwardly extending shank, which bearing surface is spaced from said other one of the arms a variable distance which changes with internal wear between said housing and ball stud; of a non-yieldable wear take-up device for said ball joint assembly mounted between the arms comprising a first member bearing upon said housing external bearing surface, a second member adjustably threadedly engaged with said first member and bearing upon said other one of the arms adjacent the connection of said shank therewith, and releasable means threadedly engaged with one of said members and engaged with the threads on the other member to lock the same against change from a given adjusted position, the adjustment of said members effecting a take-up of the internal wear by changing the spacing between the arms.

References Cited in the file of this patent

UNITED STATES PATENTS

| | | |
|---|---|---|
| 2,512,881 | Smiley | June 27, 1950 |
| 2,524,894 | Dobrin | Oct. 10, 1950 |
| 2,911,244 | Mineck | Nov. 3, 1959 |
| 2,977,131 | Moskovitz et al. | Mar. 28, 1961 |
| 3,039,787 | Meyer | June 19, 1962 |